(12) United States Patent
DeCleene et al.

(10) Patent No.: US 11,290,338 B1
(45) Date of Patent: Mar. 29, 2022

(54) SYSTEM AND METHOD FOR INFERRING A NETWORK TOPOLOGY FROM THE EDGE

(71) Applicant: BAE Systems Information and Electronic Systems Integration Inc., Nashua, NH (US)

(72) Inventors: Brian DeCleene, North Reading, MA (US); Anirudh Sabnis, Amherst, MA (US); Ramesh K. Sitaraman, Amherst, MA (US); Donald Towsley, Amherst, MA (US); Paul Vines, Leesburg, VA (US)

(73) Assignees: BAE Systems Information and Electronic Systems Integration Inc., Nashua, NH (US); University of Massachusetts, Boston, MA (US)

( * ) Notice: Subject to any disclaimer, the term of this patent is extended or adjusted under 35 U.S.C. 154(b) by 0 days.

(21) Appl. No.: 16/895,738

(22) Filed: Jun. 8, 2020

Related U.S. Application Data

(60) Provisional application No. 62/858,426, filed on Jun. 7, 2019.

(51) Int. Cl.
*H04L 29/02* (2006.01)
*H04L 41/12* (2022.01)
(Continued)

(52) U.S. Cl.
CPC ............ *H04L 41/12* (2013.01); *H04L 41/145* (2013.01); *H04L 41/16* (2013.01)

(58) Field of Classification Search
CPC .............................. H04L 41/12; H04L 41/145
See application file for complete search history.

(56) References Cited

U.S. PATENT DOCUMENTS

| 6,839,754 | B2 * | 1/2005 | Nowak | ................... H04L 41/12 709/224 |
| 7,133,370 | B2 | 11/2006 | Ikeda et al. | |

(Continued)

FOREIGN PATENT DOCUMENTS

| CN | 103281256 A | 9/2013 |
| EP | 2797257 A1 | 10/2014 |

OTHER PUBLICATIONS

Ettehad, Mahmood et al., Optimizing Consistent Merging and Pruning of Subgraphs in Network Tomography, arXiv.org, Aug. 9, 2019.

(Continued)

*Primary Examiner* — Adnan M Mirza
(74) *Attorney, Agent, or Firm* — Sarah Kim

(57) ABSTRACT

Techniques and architecture are disclosed for inferring a unified topological model of a hidden topology comprising dispersing data packets from a source to at least one receiver, and collecting individual end-to-end packet statistics; collecting aggregate end-to-end statistical measurements between a plurality of enclaves situated at an edge of an unknown network; identifying shared path correlations relating to shared links traversed between at least one root enclave and one or more leaf enclaves; constructing topological metrics as a directed tree corresponding to shared path correlations; inferring a unified topological model and routing paths of the unknown network based on the plurality of topological metrics collected by the plurality of enclaves; validating consistency between the subsequent end-to-end statistical measurements and the unified topological model of the hidden topology; and updating the inferred unified topological model of the hidden topology in accordance with observed inconsistencies.

18 Claims, 6 Drawing Sheets

(51) Int. Cl.
H04L 41/14 (2022.01)
H04L 41/16 (2022.01)

(56) References Cited

U.S. PATENT DOCUMENTS

| | | |
|---|---|---|
| 8,348,523 B1 | 1/2013 | Uhlhorn et al. |
| 9,571,348 B1 | 2/2017 | McAleer et al. |
| 9,602,387 B2 | 3/2017 | Wood |
| 10,164,864 B2 | 12/2018 | Pepe et al. |
| 10,277,471 B2 | 4/2019 | Ubaldi et al. |
| 10,805,171 B1 * | 10/2020 | Anwer ................ H04L 41/0893 |
| 2007/0091937 A1 | 4/2007 | Bu et al. |
| 2017/0048110 A1 | 2/2017 | Wu et al. |
| 2017/0346691 A1 | 11/2017 | Crickett et al. |
| 2017/0366408 A1 | 12/2017 | Kyllonen |

OTHER PUBLICATIONS

Lin, Yilei et al., Waypoint-based Topology Inference, IEEE International Conference on Communications, Jun. 2020.

Lin, Yilei et al., Multicast-based Weight Inference in General Network Topologies, IEEE International Conference on Communications, May 20-24, 2019.

Liang, Ma et al., Neural Network Tomography, arXiv.org, Jan. 9, 2020.

Bartolini, Novella et al., On Fundamental Bounds of Failure Identifiability by Boolean Network Tomography, arXiv.org, Mar. 26, 2019.

Fei, Gaolei et al., Network Topology Inference Using Higher-Order Statistical Characteristics of End-to-End Measured Delays, IEEE Access, Mar. 23, 2020.

* cited by examiner

SYSTEM AND METHOD FOR INFERRING A NETWORK TOPOLOGY FROM THE EDGE

CROSS-REFERENCE TO RELATED APPLICATIONS

This application claims the benefit of U.S. Provisional Patent Application No. 62/858,426, filed on Jun. 7, 2019, which is herein incorporated by reference in its entirety.

STATEMENT OF GOVERNMENT INTEREST

This invention was made with government support under Contract No. N66001-15-C-4045 awarded by the Department of the Navy. The United States Government has certain rights in the inventions.

FIELD OF THE DISCLOSURE

The following disclosure relates generally to network topology, more specifically sensing and inferring the topology of an unknown, third-party network from the edge.

BACKGROUND

Modern enterprises depend on a complex ecosystem of fixed and wireless network technologies managed by third-party network service providers (NSP). Operating at the edge of the network, enterprises lack explicit knowledge about the hidden topology of the NSP's network, such as the nodes and links of the network, characteristics of these nodes and links, and the routes on these nodes and links that packets take between their hosts. Furthermore, NSPs regularly establish peering agreements with other NSPs with similar limited insight into the topology of their partner's network. Despite the inability to directly access the network's topology and routes, knowledge of the underlying topology provides opportunities for improved end-to-end service, increased cyber resilience, and precision network control. For instance, given topology and routes, the enterprise can better understand the impact of internal node (i.e., router) and link failures on its mission-critical communication, leading to better disaster planning and faster recovery. Further, knowing the network topology and routes allows for better performance monitoring and resource management. Therefore, there is a need for a solution that allows a user to infer a unified topological model of an unknown network from edge observations.

SUMMARY

An example embodiment of the present disclosure provides a system for inferring a unified topological model of a hidden topology including a plurality of enclaves situated at an edge of the unknown network and configured to collect a plurality of statistical measurements pertaining to end-to-end flows between each of the plurality of enclaves; a first non-transitory computer-readable medium having instructions encoded thereon that, when executed by one or more processors, process the plurality of statistical measurements to construct a plurality of topological metrics as a directed tree corresponding to observed correlated traffic behavior relating to shared links traversed within an enclave group; and a second non-transitory computer-readable medium having instructions encoded thereon that, when executed by one or more processors, process the plurality of statistical measurements and a plurality of topological metrics, and infer the topology of the unknown network.

Another example embodiment provides a method for inferring a unified topological model of a hidden topology including dispersing a plurality of data packets from a source to at least one receiver, and collecting individual end-to-end packet statistics; collecting a plurality of aggregate end-to-end statistical measurements between a plurality of enclaves situated at an edge of the unknown network; identifying a plurality of shared path correlations relating to shared links traversed between at least one root enclave and a remainder of enclaves; constructing a plurality of topological metrics as a directed tree corresponding to shared path correlations; inferring a unified topological model of the hidden topology based on the plurality of topological metrics collected by a plurality of enclaves; validating consistency between the subsequent end-to-end statistical measurements and the unified topological model of the hidden topology; and updating the inferred unified topological model of the hidden topology in accordance with observed inconsistencies.

Particular implementations may include one or more of the following features. The method may include extracting a plurality of end-to-end packet and statistical measurements from passive network observations. It may also include extracting a plurality of end-to-end statistical measurements from a plurality of multicast probes and a plurality of unicast probes, wherein the plurality of multicast probes and the plurality of unicast probes are exchanged between the enclaves. The method may include correlating topological path sharing and distance metrics from observed traffic measurements taken at a network edge and representing the topological path sharing and distance metrics as a mathematical tree. The method may also include formulating a minimal unified topological model that obeys topological path sharing and distance metrics as a solution to an objective function. The step of inferring a unified topological model includes using a mixed-integer bilinear optimization approach on topological metrics, thereby inferring topology and routing paths. The method may include expressing objective function balancing the number of links, and the total host-to-host shortest path distance. The method may also include optimization constraints from topological metrics. These constraints include constraints on the path sharing metrics (PSMs) between root and leaf enclaves; constraints on the distance metrics (DMs) between the root and leaf enclaves; constraints forming plurality of links belonging to the same directed tree corresponding to shared path correlations; constraints on the number of hops between pair of enclaves; and constraints on the number of nodes between pair of enclaves. Additionally, the step of inferring a unified topological model includes constructing a plurality of feasible hidden topologies by utilizing a tree stitching approach in an iterative manner, wherein the plurality of feasible hidden topologies obeys the path sharing and distance metrics.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. More-

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

This disclosure relates to a method for inferring a unified topological model of a hidden topology including dispersing a plurality of data packets from a source to at least one receiver, and collecting individual end-to-end packet statistics; collecting a plurality of aggregate end-to-end statistical measurements between a plurality of enclaves situated at an edge of an unknown network; identifying a plurality of shared path correlations relating to shared links traversed between at least one root enclave and a number of leaf enclaves; constructing a plurality of topological metrics as a directed tree corresponding to shared path correlations; inferring a unified topological model and routing paths of the unknown network based on the plurality of topological metrics collected by the plurality of enclaves; validating consistency between the subsequent end-to-end statistical measurements and the unified topological model of the hidden topology; and updating the inferred unified topological model of the hidden topology in accordance with observed inconsistencies.

Network service providers (NSP) often provide edge users with limited insight into their network topology such as nodes and links; available bandwidth; and routing paths. NSP's network infrastructure is often hidden to users on the edge in order to maintain private control and security of their infrastructure. However, this hidden topology presents a level of performance uncertainty to such edge users. For example, NSP's hidden topologies are still vulnerable to cyber-attacks. If a cyber-attack does occur against the hidden topology, edge users, who have no insight into the hidden core of the network, are exposed to security risks and vulnerable to service disruption. As a result, edge users desire insight into and limited control of the NSP's hidden topology. Such insight grants edge users the ability to identify, localize, and locally remediate problems like a cybersecurity attack.

Thus, and in accordance with an embodiment of the present disclosure, techniques and architecture are disclosed for a system and method for inferring a unified topological model of a network's hidden topology. The present disclosure approaches hidden topology inference as an optimization problem where the resultant unified topological model consists of the smallest topology that is consistent with the end-to-end statistical observations. For example, the smallest topology contains both the smallest number of links as well as the smallest total host-to-host shortest path distance.

Figure 1:
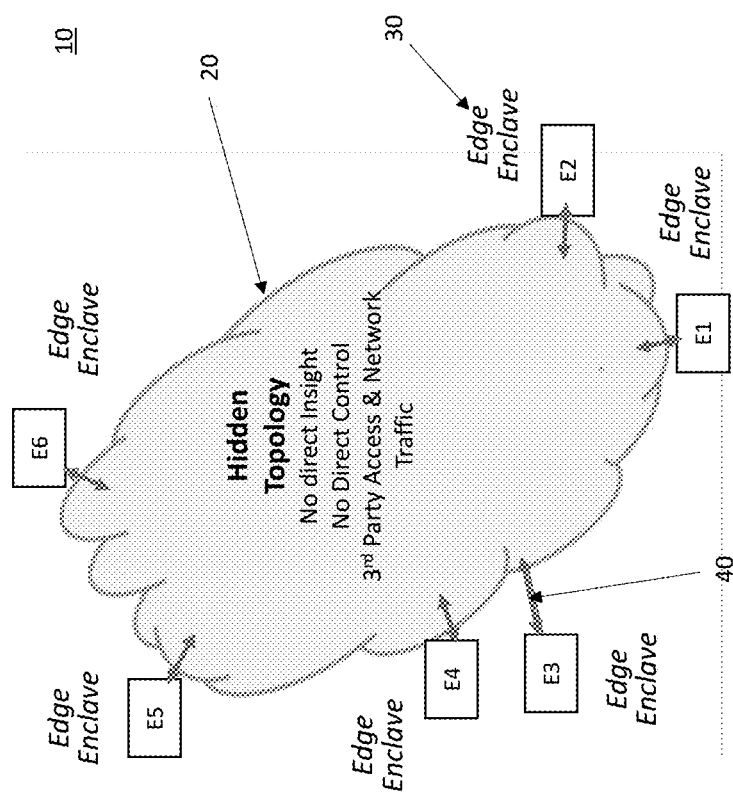
FIG. 1 is an operational illustration of an embodiment of the present disclosure.

FIG. 1 illustrates a system 10 for inferring a unified topological model of a hidden topology 20 configured in accordance with an embodiment of the present disclosure. A communication network may comprise various hosts, internal nodes such as routers, and links. However, the core of the network in one example has a hidden topology 20 that such that the elements may be unknown to services deployed at the edge of the network. These edge services or enclaves 30 (E1-E6) may be unable to directly observe or interact with elements in the core network that provides no direct insight, no direct control and has $3^{rd}$ party access and network traffic. The system in the present disclosure may infer the structure and characteristics of the network's hidden topology 20 through statistical observations of the traffic flows 40 that are (a) between sets of edge services or enclave groups and (b) traverse the core network.

In accordance with an embodiment of the present disclosure, the system comprises a plurality of enclaves 30 situated at the edge of the network. The edge enclave 30 in one example serve as both a root enclave and a leaf enclave. Additionally, the root enclave and the leaf enclaves performs the steps of the method disclosed herein simultaneously, thereby allowing the enclaves to make statements regarding the ascertained paths and routes at about the same time. The enclaves (roots and leaves) are part of the system and cooperating at the edge with the network in the middle that in this example is a non-cooperative component. In one embodiment, additional passive sensing techniques are used to collect information for a leaf system that is not cooperating. Each root enclave, along with the its leaf enclaves (enclave group) provides a different perspective of the hidden topology 20 as observed from its particular location on the network's edge. The present disclosure establishes a unified topological model that includes the nodes and links of the network; how those nodes and links are connected in order to form a connected graph; various characteristics of these nodes and links, such as bandwidth and delay; and routes on these nodes and links that the data packets take between hosts. The enclaves in this example act as a root as well as a leaf so there is that in one respect is analogous to a peer-to-peer network. However, the collected trees from the enclave groups are combined by the aggregator at a single location.

Figure 2:
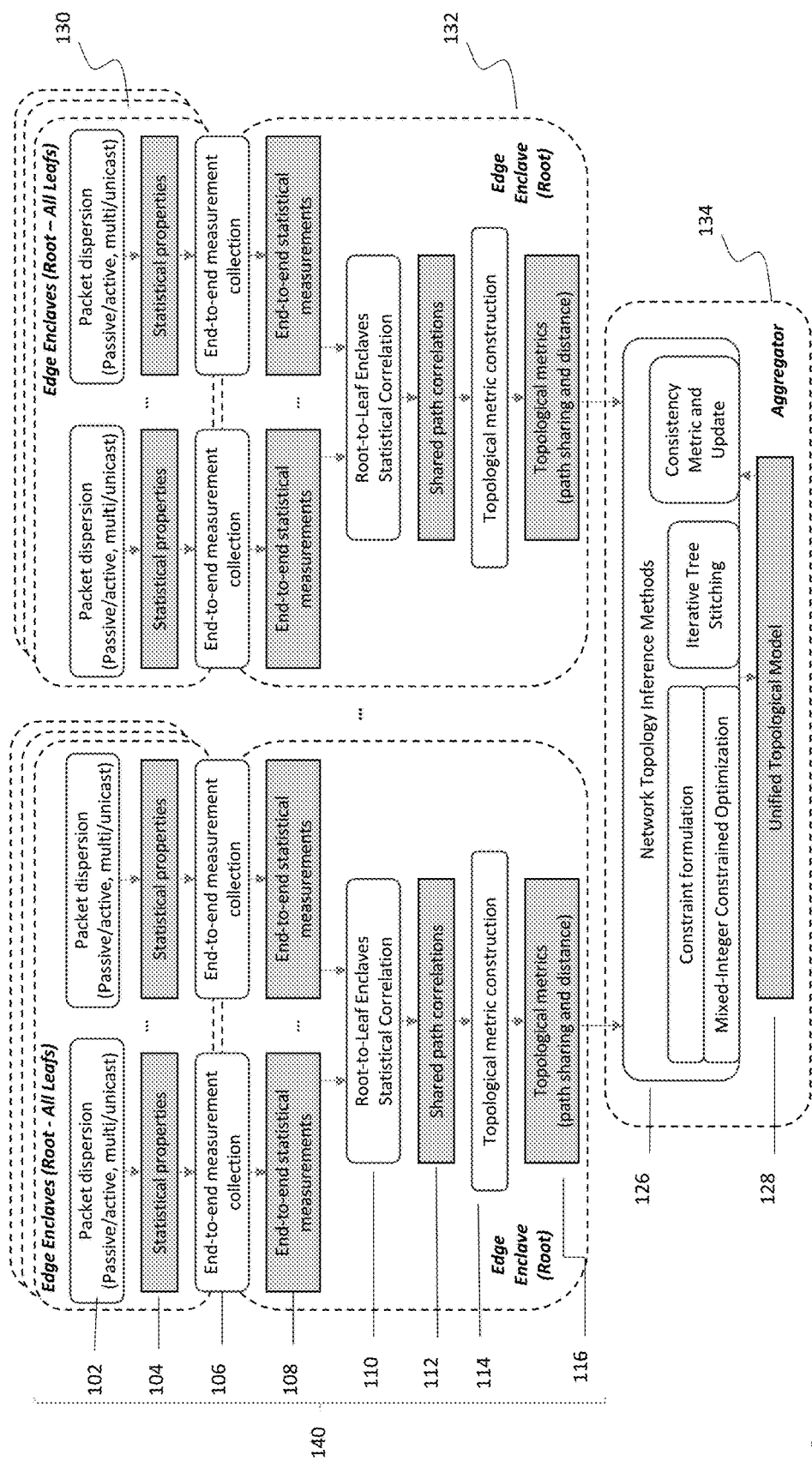
FIG. 2 is a flow chart illustrating a method for inferring a unified topological model according to one embodiment.

FIG. 2 depicts a flow chart illustrating a method for inferring a unified topological model in accordance with an embodiment of the present disclosure. The root enclaves 132 interacts with one or more the leaf enclaves 130 as an enclave group 140 to collect statistical properties of packets traversing the hidden network. An enclave group 140 consists of one or more root enclaves with one or more leaf enclaves that provide topological metrics to the aggregator. In one example there is a single root enclave with multiple leaf enclaves. In another example there are multiple root enclaves with multiple leaf enclaves. A plurality of enclave groups 140 provide multiple topological metrics to the aggregator. The root enclaves and leaf enclave in this example are not distinct groups but rather have roles as being root enclaves and leaf enclaves. In one example if there are N enclaves, there are N root nodes and each root node has N−1 leafs.

The root enclave 132 analyzes the observed packet's statistical properties to construct topological metrics corresponding the each root enclave's different perspective of the hidden topology. The different perspectives are combined at an aggregator 134 to infer the unified topological model 128. In one embodiment, the aggregator is one of the enclaves. In another embodiment, the aggregator is a separate processor or processing section.

In order to collect traffic measurements needed to infer a unified topological model, FIG. 2 discloses a system of the present disclosure that utilizes data packets in order to understand how the observed traffic behavior is correlated within the hidden topology as a result of a common link or node. The root enclave disperses unicast and/or multicast data packets to the leaf enclaves in order to characterize the various routes and paths comprising the network in question 102. The packets are typically exchanged from the root to the leafs and also from the leafs to the root. A unicast data packet is a data packet sent from a single sender to a single receiver. Generally, the destination address identifies a specific end-point on the network. In contrast, a multicast data packet is delivered from a single sender to multiple receivers. As a result, the address acts like an alias for a set of end-points rather than a specific end-point. As the multicast packet traverses the network, the packet may be duplicated, thereby allowing all intended recipients to receive a copy. The root enclave can utilize active or passive packet dispersion to probe the hidden topology and collect per-packet statistical properties 104 when seeking to characterize the network and determine the various routes and paths in the unknown part of the network. Such statistical properties include individual packet loss, packet latency, packet inter-arrival time, and changes in packet time-to-live (TTL). For active dispersion, an enclave will introduce its own data packets into the network in order to collect observed statistical properties. For example, an enclave may send out a data packet and measure the time it takes to receive a reply from an intended recipient. In contrast, passive dispersion occurs when an enclave simply observes naturally occurring traffic in the network.

Figure 3:
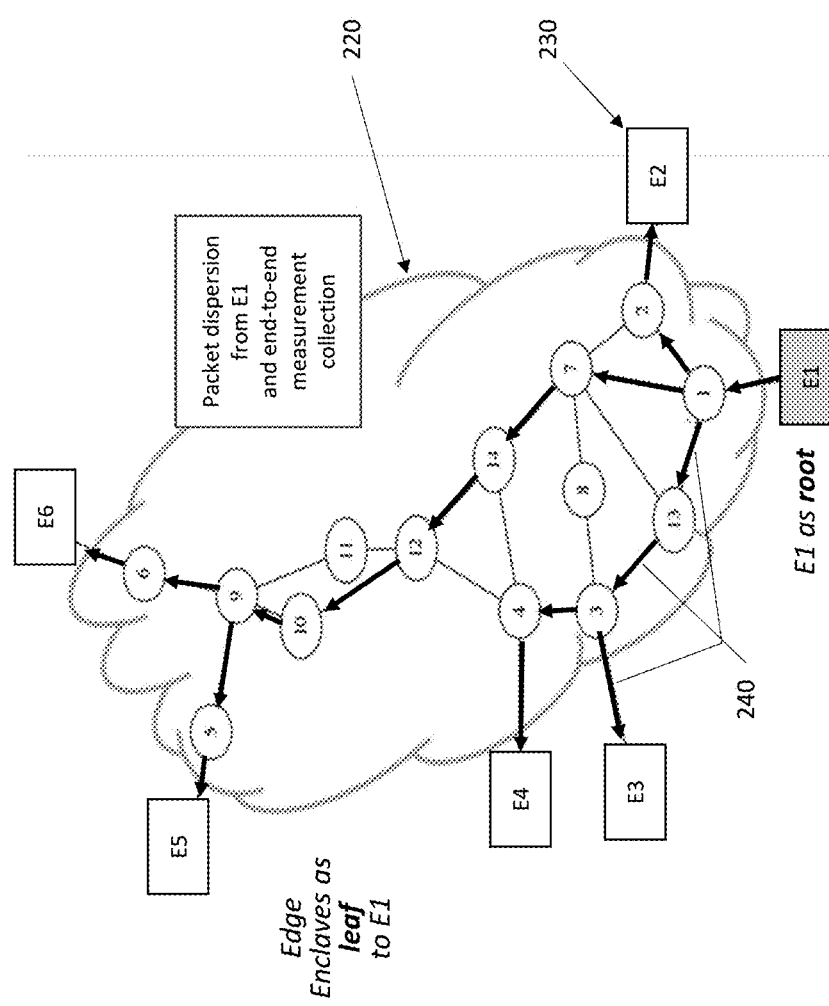
FIG. 3 is a diagrammatic illustration of packet dispersion and end-to-end measurement collection for a root enclave to leaf enclaves according to one embodiment.

FIG. 3 illustrates packet dispersion between the enclaves 230 within the hidden topology 220. In this example the packet dispersion is from enclave E1 operating as the root to other leaf enclaves E2 E6 over a hidden topology 220. Data packets from E1 are sent to each of the other enclaves (E2-E3). These packets traverse the hidden topology in accordance to the hidden network structure and associated hidden routing paths 240. For example, packets to enclave E3 and E4 share portions of the routing path (e.g., node 1-13-3). Packets to E5 and E6 follow a routing path that is distinct from the routing path to E3 and E4. Packet dispersion collects per-packet statistical properties from individual packets traveling these paths and, as outlined later, aggregates that information into end-to-end statistical measurements.

Additionally, utilizing data packets and measuring various statistical properties are what allow the system of the present disclosure to operate completely at the edge of the network without cooperation from the network or even the network administrator. In comparison, existing techniques and systems for inferring network topologies generally require some level of cooperation from the network. This may include being able to directly ask the network about its routing paths or directly probing the network routers. The present disclosure does not need such cooperation from the network or network administrator in order to infer the complete network topology. Additionally, existing techniques and systems operate assuming the topology is known to the user. This is in contrast with the present disclosure, where the topology of the network is completely unknown to the user.

Turning back to FIG. 2, in accordance with an embodiment of the present disclosure, the root enclave collects various end-to-end measurements 106 between the leaf enclaves 130 that are situated at the edge of the hidden topology by collecting packet statistical properties in order to infer the topology of the network. Processing end-to-end statistical measurements 108 from the packet properties that in one example include bandwidth, loss rate, and latency. Such end-to-end statistical measures 108 are represented as probability distributions (e.g., individual and joint) and summary metrics (e.g., mean, median). Embodiments of the present disclosure have collected these measurements in different ways depending on the particular domain. This may include, but is not limited to, the following: (1) Transmission Control Protocol (TCP) parameters (such as round-trip-time and retransmission timeouts) extracted from active TCP sessions; (2) examination gaps in packet sequence numbers taken from a network tap; and (3) multicast and unicast probe messages generated between pairs of edge enclaves. In this example the root enclave manages the processing and reports the results to the aggregator.

Figure 4:
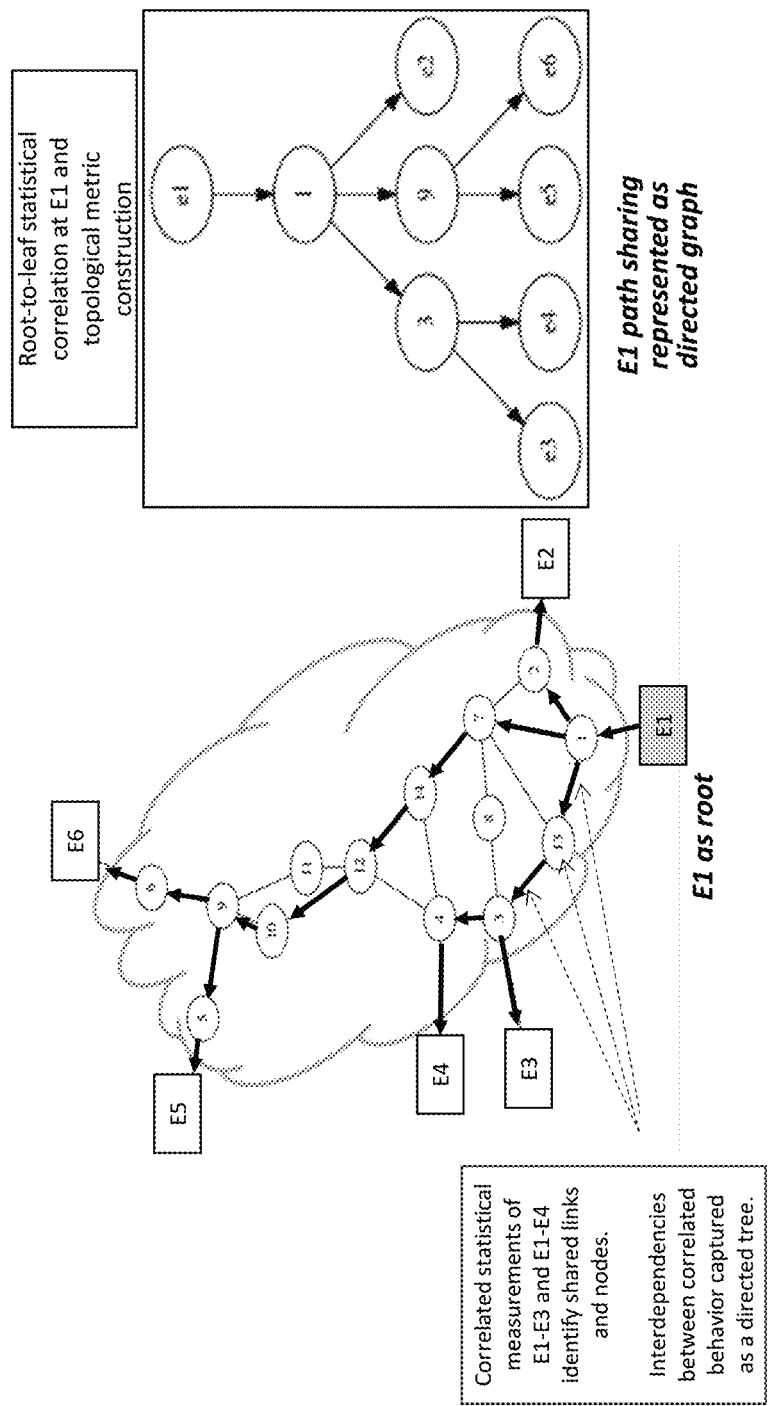
FIG. 4 is a diagrammatic illustration of topologically correlated statistical measurements and a PSM tree rooted at edge enclave E1 according to one embodiment.

In accordance with an embodiment of the present disclosure, root-to-leaf enclaves statistical correlation 110 identifies characteristics indicative of a shared node or link within the end-to-end statistical measurements. The statistical correlation techniques in one example are standard cross-correlation and covariance processing on the packet measurements. When employed on delay it is referred to as delay covariance. This leads to shared path correlations 112, indicating whether any of the observed statistical measurements are indicative of shared paths in the hidden topology. The root processing then uses these shared path correlations as a directed tree 114 to construct topological metrics, such as path sharing and distance metrics, 116. The correlated traffic behavior observed by the enclave, which relates to any shared links that are traversed between a set of root enclaves and their respective leaf enclaves corresponds to a directed tree as illustrated in FIG. 4.

In accordance with the present disclosure, the directed tree for each root enclave can be inferred by repeatedly using the relative values of the delay covariances discussed below. Specifically, the present disclosure utilizes statistical correlation between distributions of packet delays for two leaf enclaves sharing the same root enclave. These correlated end-to-end statistical measurements may indicate the degree that the routing path from the root to each of the two leaf enclaves is shared. The packet distributions are collected during packet dispersion from the specified root. More precisely, multiple unicast or multicast probes each consisting of n back-to-back packets are sent to the n receivers, wherein the receivers are the leaf enclaves. At each receiver, the delay experienced by each packet is recorded. The recorded delays are then used to compute the delay covariance between every pair of receivers. According to one example, the covariance is the mean value of the product of the deviations of two variates from their respective means. During computation, if a packet is not received at one of the receivers, the corresponding packet at the other receiver is ignored. Generally, the delay covariance experienced by these packets at the receivers when sent from the same source is proportional to the number of shared links on the path from the source to the pair of receivers. For instance, the directed tree in FIG. 4 can be constructed by designating the pair of destinations (enclaves E3 and E4) with the highest delay covariances as siblings. Similarly, E5 and E6 are correlated as siblings. Next, the destination can be extracted with the highest value of delay covariance with either E3 or E4 (in this case, the E5-E6 pair) such that they become siblings. This process continues until the entire directed tree is inferred. The directed tree along with measured properties assigned to locations in the tree represent path sharing and other distance metrics.

Two types of topological metrics of network routing paths may be used in accordance with an embodiment of the present disclosure: path sharing metrics (PSM) and distance metrics (DM). PSMs measure whether and to what extent routes between various hosts within a network share links and to what extent these routes overlap. Additionally, the present disclosure does not require absolute values of PSMs; rather, the present disclosure may utilize relative values. DMs measure the distance between a source host and a target host. Specifically, DMs examine the number of hops in the path or paths between the source host and certain target hosts. As with PSMs, the present disclosure may utilize relative values of the DMs.

Relative to the flow chart of FIG. 2, in accordance with an embodiment of the present disclosure, one of the root enclaves is utilized as the centralized aggregator 134 of all of the collected data from the edge enclaves in the system. The centralized aggregator 134 collects all of the gathered topological metrics and other evidence from the edge enclaves and processes them using the network topology inference methods 126 to generate the unified topological model 128. This is also shown in FIG. 5.

Figure 5:
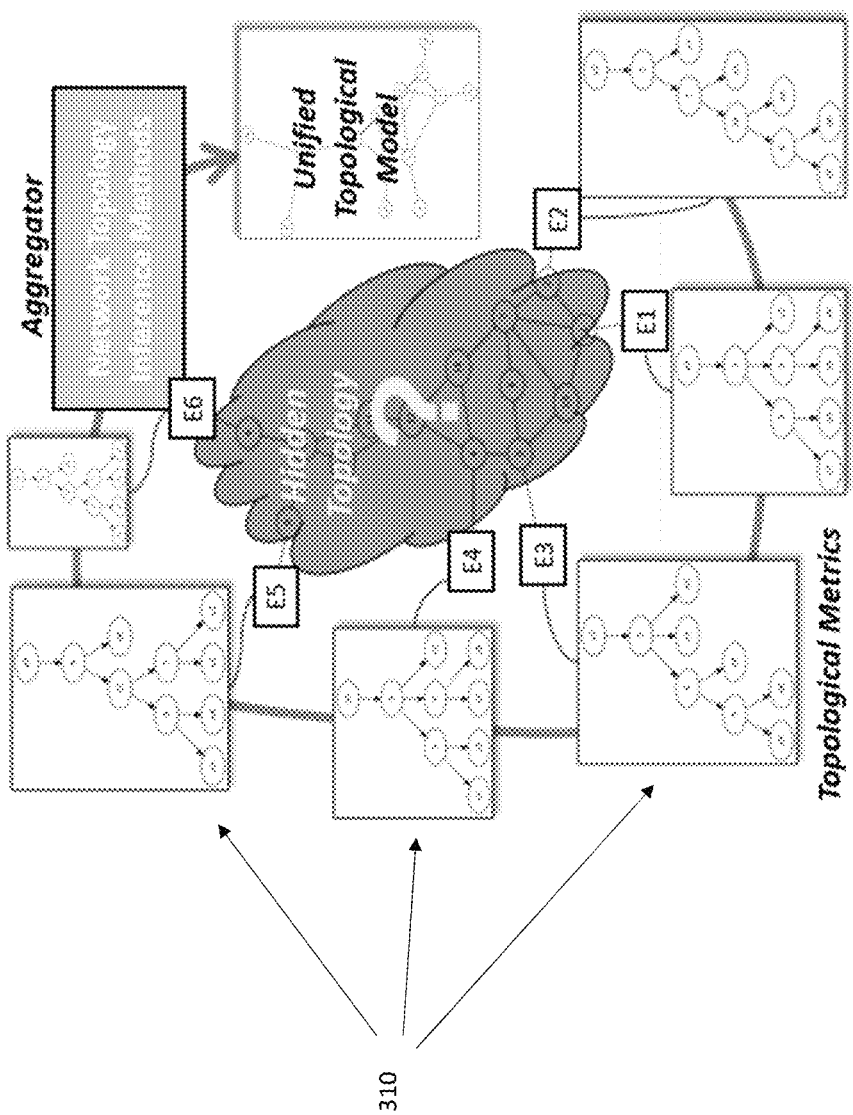
FIG. 5 is an illustration showing how the various trees produced by the enclaves are combined to construct a unified topological model according to one embodiment.

FIG. 5 shows the exchange relative to a physical laydown of enclaves around the hidden topology. Each enclave sends its topological metrics to the aggregator 310. Each of these topological metrics coincide with the data collected by the enclave acting in the role as a root. The set of directed trees are processed by the aggregator 310 to generate the unified topological model for the hidden topology.

Figure 6:
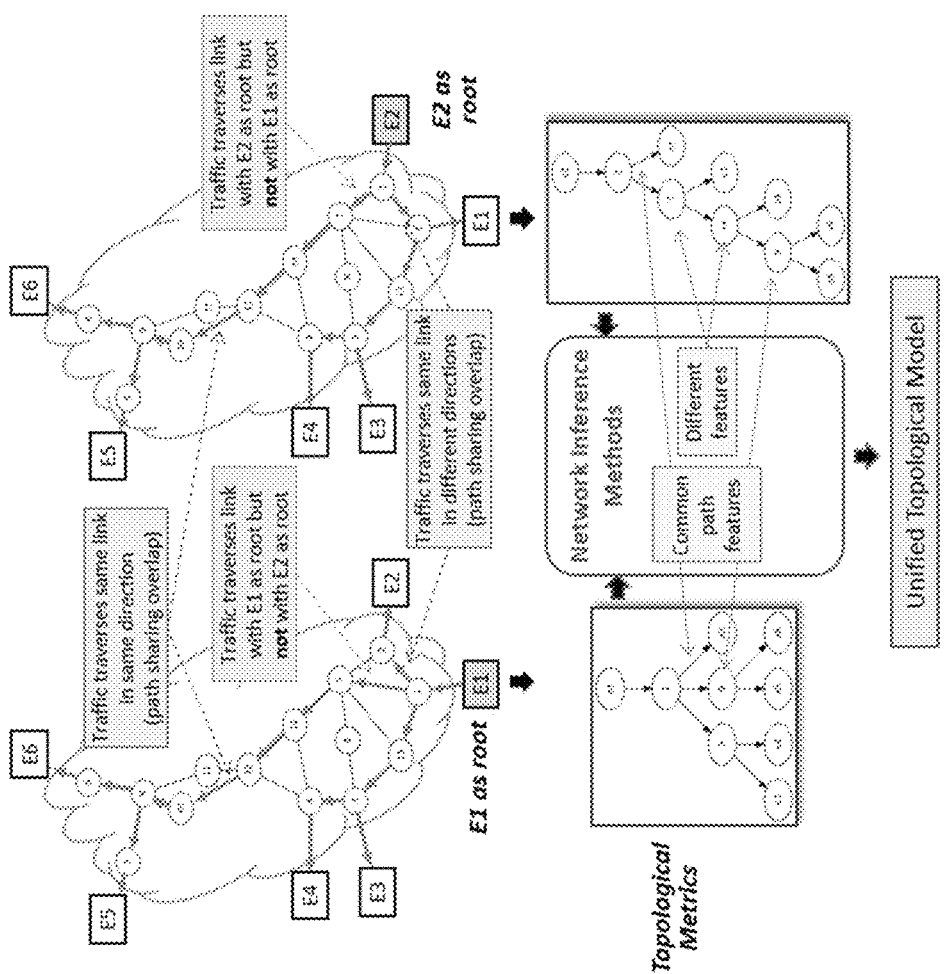
FIG. 6 is diagrammatic illustration of some identifying characteristics within topological metrics used to infer a unified topological model according to one embodiment.

The ensemble of topological metrics encodes different root enclave's perspectives on the hidden topology to include indicators of both topological structure and path sharing as illustrated in FIG. 6. In FIG. 6, a subset of shared paths are labeled (top) and the corresponding directed trees (bottom). Packet dispersion followed by analysis result in the topological metrics of the directed trees are used by network inferencing to identify common and different features that indicate structure within the hidden topology and create the unified topological model.

In accordance with the present disclosure, there are several methods used to infer and validate a unified topological model for the hidden topology 126. One method is utilizing a mixed-integer constrained optimization. The desired characteristics of the network are captured as various constraints in a mixed-integer constraint optimization problem that determines the topological model and the routing paths that best explain the observed topological metrics. The existence of nodes and links, as well as the membership of links in the various routing paths, serve as indicator variables, and an optimization process sets the values of those indicator variables. As a result, the values of these indicator variables as set by the optimization process are what yield the inferred network topology and routing paths.

In accordance with an embodiment of the present disclosure, an optimization process is utilized to establish variables representing the various nodes and links in a unified topological model as well as the routing paths connecting those nodes and links. The following table includes, but is not limited to, several examples of these variables.

| Symbol | Meaning |
| --- | --- |
| $s_{i,j}^S$ | An indicator variable indicating if link (i, j) belongs to any path with host S as the source. |
| $d_{i,j}^T$ | An indicator variable indicating if link (i, j) belongs to any path with host T as the destination |
| $m_j^S$ | An integer variable denoting the number of hops required to reach node j front host S |
| $v_j^{S,T}$ | An indicator variable indicating if node j is on the path from host S to enclave T |
| $w_{ij}$ | an indicator variable indicating if the link (i, j) is present in the inferred graph |

The present disclosure utilizes an objective function as part of the solution. This objective function captures the notion that the inferred network should have (i) the smallest number of links, and (ii) the smallest total host-to host shortest path distance. A form of the objective function is below with the first term capturing (i) and the second term capturing (ii). The variable α defines the relative weighting of the two terms. In addition to symbols defined in the previous table, H is the set of enclaves with s and t the source and destination enclaves respectively. V are the set of hidden vertices.

$$\min: \alpha \sum_{s \in H} \sum_{t \in H} m_t^s + (1 - \alpha) \sum_{i \in V} \sum_{j \in V} \omega_{ij}.$$

Additionally, the present disclosure utilizes various constraints in conjunction with the objective function in the optimization process. These constraints capture each measurement and the host-to-host distance where each of these measurements represent the relative delay covariance between a source and pairs of receivers. Apart from the statistical measurements, the notion of a simplistic network are also captured as constraints. In one embodiment, a network with routing paths may be found such that the paths to a receiver host from different source hosts form a tree.

In one embodiment, one such constraint is the PSM constraint. PSMs measure to what extent routes (a.k.a., paths) between hosts share links. For example, PSM (S, Ti, Tj) represents the number of links shared between the paths from a single source host S to two destination hosts, Ti and Tj. The present disclosure does not require measuring absolute values for these PSMs; rather, the present disclosure measures and utilizes relative values. For example, given a source S and three destinations (T1, T2, and T3), the present disclosure would measure how PSM (S, T1, T2) compares to PSM (S, T2, T3). Given the measurement, an appropriate constraint capturing the relative measurement is added for every source and destination triplet. Further, the number of constraints are reduced by dropping any redundant constraints. A mathematical formulation of this constraint, consistent with previous definitions, is as follows $$\sum_{i \in V} v_i^{S,T_1} v_i^{S,T_2} < \sum_{i \in V} v_i^{S,T_2} v_i^{S,T_3 1}$$

In one embodiment, another constraint is relative distance captured as distance metrics (DMs). A DM measures the distance in terms of the number of links in the path from a source host S to a receiver host T. As with PSMs, the present disclosure does not require measuring absolute values of these DMs. Rather, the present disclosure measures and utilizes relative DM values. For example, given a single source S and two destinations T1 and T2, it suffices to measure how DM (S, T1) compares to DM (S, T2). A minimal number of constraints capturing the relative measures of the DMs are then added as constraints to the optimization process. A mathematical formulation of this constraint, consistent with previous definitions, is as follows $$m_S^{T_1} < m_S^{T_2}$$

In addition to PSMs and DMs, there are other constraints utilized in accordance with the present disclosure. Source tree constraints are one example, which help ensure that the routing paths from a source host to the receiver hosts form a tree. More particularly, this ensures that if two paths from the same source host ever diverge, then those two paths do not meet again. Source oblivious path constraints are another example. Typically, a data packet at a router $i \in V$ is forwarded to the next router $j \in V$ by consulting a routing table that provides the "next hop" for each receiver host. This is independent of the data packet's source. More particularly, two data packets may arrive at a router i from different sources before being forwarded to the same next router j if they are going to the same destination T. This property of the network under observation is captured as a constraint. Presence of host-to-host path is another constraint that may be used in accordance with an embodiment of the present disclosure. This constraint is added to the optimization process to ensure that there exists a routing path between every pair of hosts in the inferred network. Non-cyclic host-to-host path is another constraint that may be used in accordance with an embodiment of the present disclosure. This constraint is added to ensure that the routing paths between every pair of hosts is non-cyclic. Mathematical formulations of these constraints are shown in the table below.

| Constraint | Mathematical Formulation |
| --- | --- |
| Source-oblivious paths | $\sum_{j \in V} d_{ij}^T \leq 1 \forall i \in V, T \in H$ |
| Source tree property | $\sum_i s_{i,j}^S <= 1 \forall j \in V\ S \in H$ |
| Constraints to calculate distances | $m_j^S = \sum_i s_{i,j}^S (m_i^S + 1) \forall S \in H\ j \in V$ |
| Tracing a host-to-host path | $v_i^{S,T} = \sum_j v_j^{S,T} s_{ij}^S \forall S, T \in H, \forall i \in V - H$ |

Another method used to infer a unified topological model of a network's hidden topology is to utilize iterative tree stitching to construct feasible hidden topologies as seen in FIGS. 5 and 6. Tree stitching infers the topology by iteratively merging components of each PSM (as represented as a tree) to form a final unified topological model (represented as a graph) that is compliant with each of the independent PSM trees. Various heuristic merge rules are used to incrementally expand and reduce the graph representation with each round. For example, under the bi-directional flow rule (a.k.a, symmetric routing), the set of nodes between a pair of edge enclaves, A and B, must be at least the larger of the length from A to B and length from B to A. The following table includes, but is not limited to, several examples of tree stitching rules under this disclosure:

| Rule | Definition |
| --- | --- |
| Node Hypothesis | Every vertex (a.k.a. node) on the PSM directed tree corresponds to a router in the hidden infrastructure |
| Bi-Directional Flow Rule | Any vertex on the path from the PSM directed tree's root X to leaf node Y is also on the path from Y to X |
| Consistent Routing Rule | All flows through vertex N that go to the same leaf enclave will observe the same PSM directed sub-tree below N |
| Single Path Rule | For each vertex, there is only one edge that forwards to the leaf enclave as the destination |

An embodiment of the present disclosure may allow for tree stitching of PSMs to form the partial or complete topology independent of an optimization formulation, or use it to construct constraints for the optimization approach. When used in isolation, a set of qualifying candidate topologies may be provided and a final solution may be chosen based on the desired characteristics. In the standard instantiation, the stitched topology with the fewest number of internal nodes (i.e. smallest) is generally selected. Tree stitching may start with the largest hidden topology assumption and execute rules to reduce (upper-bound formulation); start with a minimum hidden topology assumption and execute to expand (lower-bound formulation); or hybrid approaches of the two formulations.

In the upper-bound formulation, the initial graph is constructed by initially merging all the leaf and root enclaves of all the PSM directed trees such that the combined graph represents the maximum sized hidden topology. The rules are than iteratively applied to reduce the graph structure until no further reductions are possible.

In the lower-bound formulation, the initial graph is constructed from one of the PSM directed trees. Then, the PSM directed trees for each additional root enclave is iteratively merged with the current graph using the rule set until all the PSM directed trees have been combined.

Incrementally during tree stitching or periodically under optimization, the system of the present disclosure validates consistency between the observed end-to-end statistical measurements and the inferred topological model. For example, a communication network is denoted as N=(G, H, P) where G=(V, E) is the inferred graph, H is the set of hosts in the network, and P is a set of host-to-host paths. V and E are the graph's vertices and edges respectively. To quantitatively measure the accuracy of inferred network N', two scores are defined by the system: Network Similarity (NS) and Path Edit Distance (PED). The NS score measures how close the inferred graph G'=(V', E') is to the ground truth of G=(V, E). Intuitively, the "best" one-to-one mapping $\varphi$: V→V' is computed to match the vertices of one graph with the vertices of the other. The percentage of links that are matched under $\varphi$, i.e., the percentage of links present in both graphs, are then computed. The PED metric for path sets P and P' is the average path edit distance between the corresponding paths in P and P'. Path edit distance between two paths is simply the number of node insertions, deletions, and substitutions required to convert one path to the other. The overall PED metric is simply the average PED of the individual path pairs.

Further, an embodiment of the present disclosure may be coded and may run on any standard hardware. It may be implemented using Python, C-code, and some optimization libraries, all executing on a computer with an operating system such as Linux. It may also run on a Windows box or suitable Internet of Things (IoT) device. Another embodiment of the present disclosure is for an implementation on a field programmable gate array (FPGA).

Based on the unified topological model of the hidden topology, the system provides improved end-to-end service, increased cyber resilience, and precision network control. With knowledge of the topology and routes, the enterprise has improved responses to internal node (i.e., router) and link failures on its mission-critical communication providing disaster planning and faster recovery. Further, knowing the network topology and routes allows the network provider to provide better performance monitoring and resource management.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A system for inferring a unified topological model of a hidden topology, comprising:
   a plurality of enclaves situated at an edge of an unknown network and configured to collect a plurality of statistical measurements pertaining to end-to-end flows between the plurality of enclaves, wherein the plurality of enclaves act as both a root enclave and a leaf enclave, thereby providing different perspectives for the hidden topology;
   a first non-transitory computer-readable medium having instructions encoded thereon that, when executed by one or more processors, process the plurality of statistical measurements in order to construct a plurality of topological metrics as a directed tree corresponding to observed correlated traffic behavior relating to shared links traversed within an enclave group; and
   a second non-transitory computer-readable medium having instructions encoded thereon that, when executed by one or more processors, process the plurality of statistical measurements and the plurality of topological metrics from around the edge of the unknown network to form a plurality of directed trees, and infer the unified topological model of the hidden topology by combining the plurality of directed trees.

2. The system of claim 1, wherein the leaf enclave provides the statistical measurements and the root enclave constructs the topological metrics.

3. The system of claim 1, wherein the inferring of the unified topological model of the hidden topology is done at an aggregator.

4. The system of claim 3, wherein the aggregator utilizes a tree stitching approach in an iterative manner.

5. A method for inferring a unified topological model of a hidden topology, comprising:
   dispersing a plurality of data packets from a source to at least one receiver, and collecting individual end-to-end packet statistics;
   collecting a plurality of aggregate end-to-end statistical measurements between a plurality of enclaves situated at an edge of an unknown network;
   identifying a plurality of shared path correlations relating to shared links traversed between at least one root enclave and one or more leaf enclaves;
   constructing a plurality of topological metrics as a directed tree corresponding to shared path correlations;
   forming a plurality of directed trees;
   combining the plurality of directed trees;
   inferring a unified topological model and routing paths of the unknown network based on the plurality of directed trees;
   validating consistency between the subsequent end-to-end statistical measurements and the unified topological model of the hidden topology; and
   updating the inferred unified topological model of the hidden topology in accordance with observed inconsistencies.

6. The method of claim 5, further comprising extracting a plurality of end-to-end packet and statistical measurements from passive network observations.

7. The method of claim 5, further comprising extracting a plurality of end-to-end statistical measurements from a plurality of multicast probes and a plurality of unicast probes, wherein the plurality of multicast probes and the plurality of unicast probes are exchanged between the enclaves.

8. The method of claim 5, further comprising correlating topological path sharing and distance metrics from observed traffic measurements taken at a network edge and representing the topological path sharing and distance metrics as a mathematical tree.

9. The method of claim 5, wherein inferring a unified topological model further comprises using a mixed-integer bilinear optimization approach on topological metrics, thereby inferring topology and routing paths.

10. The method of claim 5, further comprising formulating a minimal hidden topology that obeys topological path sharing and distance metrics as a solution to an objective function.

11. The method of claim 10, wherein the objective function is expressed by balancing the number of links and the total host-to-host shortest path distance.

12. The method of claim 5, further comprising generating optimization constraints from topological metrics comprising:
   constraints on the path sharing metrics (PSMs) between root and leaf enclaves;
   constraints on the distance metrics (DMs) between the root and leaf enclaves;
   constraints forming plurality of links belonging to the same directed tree corresponding to shared path correlations;
   constraints on the number of hops between pair of enclaves; and constraints on the number of nodes between pair of enclaves.

13. The method of claim 5, wherein inferring a unified topological model further comprises constructing a plurality of feasible hidden topologies by utilizing a tree stitching approach in an iterative manner, wherein the plurality of feasible hidden topologies obeys the path sharing and distance metrics.

14. A computer program product including one or more non-transitory machine-readable mediums encoded with instructions that when executed cause a process to be carried out for inferring a unified topological model of a hidden topology, the process comprising:
   collecting individual end-to-end packet properties within a group enclave, wherein the group enclave comprises a root enclave and a plurality of leaf enclaves situated at an edge of an unknown network;
   processing a plurality of aggregate end-to-end statistical measurements from the packet properties;
   identifying a plurality of shared path correlations relating to shared links traversed between the root enclave and the leaf enclaves;
   constructing a topological metric as a directed tree corresponding to shared path correlations;
   forming a plurality of directed trees;
   combining the plurality of directed trees; and
   inferring a unified topological model and routing paths of the unknown network based on the topological metric of the plurality of directed trees.

15. The product of claim 14, wherein the unified topological model and routing paths are provided to a network provider provides improved end-to-end service, increased cyber resilience, better maintenance and precision network control.

16. The product of claim 14, wherein constructing the topological metric as the directed tree corresponding to shared path correlations is performed using delay covariances.

17. The product of claim 14, wherein inferring a unified topological model further comprises constructing a plurality of feasible hidden topologies by utilizing a tree stitching approach in an iterative manner, wherein the plurality of feasible hidden topologies obeys the path sharing and distance metrics.

18. The product of claim 14, wherein combining the plurality of directed trees is preformed by an aggregator.

* * * * *